US010813056B2

(12) United States Patent
Urabayashi et al.

(10) Patent No.: US 10,813,056 B2
(45) Date of Patent: Oct. 20, 2020

(54) RADIO TERMINAL AND BASE STATION

(71) Applicant: KYOCERA CORPORATION, Kyoto (JP)

(72) Inventors: Hiroyuki Urabayashi, Yokohama (JP); Fangwei Tong, Machida (JP); Atsuhisa Inakoshi, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/184,368

(22) Filed: Nov. 8, 2018

(65) Prior Publication Data
US 2019/0075525 A1 Mar. 7, 2019

Related U.S. Application Data

(63) Continuation of application No. PCT/JP2017/017504, filed on May 9, 2017.

(30) Foreign Application Priority Data

May 10, 2016 (JP) ................. 2016-094334

(51) Int. Cl.
H04W 52/24 (2009.01)
H04W 92/20 (2009.01)
H04W 72/04 (2009.01)
H04W 88/02 (2009.01)
H04W 88/08 (2009.01)

(52) U.S. Cl.
CPC ..... *H04W 52/243* (2013.01); *H04W 72/0473* (2013.01); *H04W 92/20* (2013.01); *H04W 88/02* (2013.01); *H04W 88/08* (2013.01)

(58) Field of Classification Search
CPC .................................................. H04W 52/243
See application file for complete search history.

(56) References Cited

U.S. PATENT DOCUMENTS

2010/0216497 A1* 8/2010 Kawasaki ......... H04W 72/1231
455/501
2011/0116410 A1 5/2011 Sung et al.
2017/0374624 A1* 12/2017 Ahn ....................... H04W 52/54

FOREIGN PATENT DOCUMENTS

JP 2008-061250 A 3/2008
JP 2012-169740 A 9/2012
WO 2006/087797 A1 8/2006

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.3.0; Mar. 2016; pp. 1-295; Release 13; 3GPP Organizational Partners.

(Continued)

Primary Examiner — Ankur Jain
(74) Attorney, Agent, or Firm — Studebaker & Brackett PC

(57) ABSTRACT

A radio terminal according to one embodiment comprises a controller configured to receive first control information for receiving, by the radio terminal, a special downlink control channel. The special downlink control channel carries control information to the radio terminal from a first cell with no connection for transmitting and receiving user data being established. The controller directly receives second control information for reducing an uplink interference in the first cell, on the special downlink control channel, from the first cell.

11 Claims, 14 Drawing Sheets

(56) References Cited

OTHER PUBLICATIONS

Samsung; "Discussion on LAA-LAA Coexistence"; 3GPP TSG RAN WG1 Meeting #84bis; R1-162672; Apr. 11-15, 2016; pp. 1-3; Busan, South Korea.

* cited by examiner

RADIO TERMINAL AND BASE STATION

CROSS-REFERENCE TO RELATED APPLICATION

The present application is a continuation based on PCT Application No. PCT/JP2017/017504 filed on May 9, 2017, which claims the benefit of Japanese Patent Application No. 2016-094334 (filed on May 10, 2016). The content of which is incorporated by reference herein in their entirety.

The entire content of is incorporated in the present specification by reference.

FIELD

The present disclosure relates to a radio terminal and a base station.

BACKGROUND

In 3GPP (3rd Generation Partnership Project) which is a project aiming to standardize a mobile communication system, an ICIC (Inter-cell Interference Coordination) technology has been introduced to reduce inter-cell interference (see Non Patent Document 1). In the ICIC technology, radio resources used are coordinated among cells to reduce the inter-cell interference.

PRIOR ART DOCUMENT

Non-Patent Document

Non Patent Document 1: 3GPP Technical Specification "TS 36.300 V13.3.0", Apr. 1, 2016

SUMMARY

A radio terminal according to one embodiment comprises a controller configured to receive first control information for receiving, by the radio terminal, a special downlink control channel. The special downlink control channel carries control information to the radio terminal from a first cell with no connection for transmitting and receiving user data being established. The controller directly receives second control information for reducing an uplink interference in the first cell, on the special downlink control channel, from the first cell.

A base station according to one embodiment comprises a controller configured to execute a control of notifying a radio terminal of first control information for receiving, by the radio terminal, a special downlink control channel. The special downlink control channel carries control information to the radio terminal with no connection for transmitting and receiving user data being established. The controller directly transmits second control information for reducing an uplink interference at the base station, on the special downlink control channel, to the radio terminal.

A base station according to one embodiment comprises a controller configured to manage a cell in which a radio terminal exists. The controller transmits first control information for receiving, by the radio terminal, a special downlink control channel, to the radio terminal. The special downlink control channel carries second control information to the radio terminal from another base station with no connection for transmitting and receiving user data being established. The second control information is information for reducing an uplink interference at the other base station.

A base station according to one embodiment comprises a controller. The controller controls: a process of determining whether or not a channel in an unlicensed spectrum is available, and a process of transmitting control information in the channel to another base station, between a first timing at which it is determined that the channel is available and a second timing at which transmission of a reference signal or a data signal is started. The control information may be information for reducing an uplink interference from a radio terminal in the base station. In the radio terminal, a connection for transmitting and receiving user data may not be established with the base station.

A base station comprises a controller. The controller controls: a process of determining whether or not a channel in an unlicensed spectrum is available, and a process of transmitting, in the channel, control information for reducing an uplink interference in the base station, to a radio terminal with no connection for transmitting and receiving user data being established with the base station, between a first timing at which it is determined that the channel is available and a second timing at which transmission of a reference signal or a data signal is started.

DESCRIPTION OF THE EMBODIMENT

Overview of Embodiment

Figure 1:
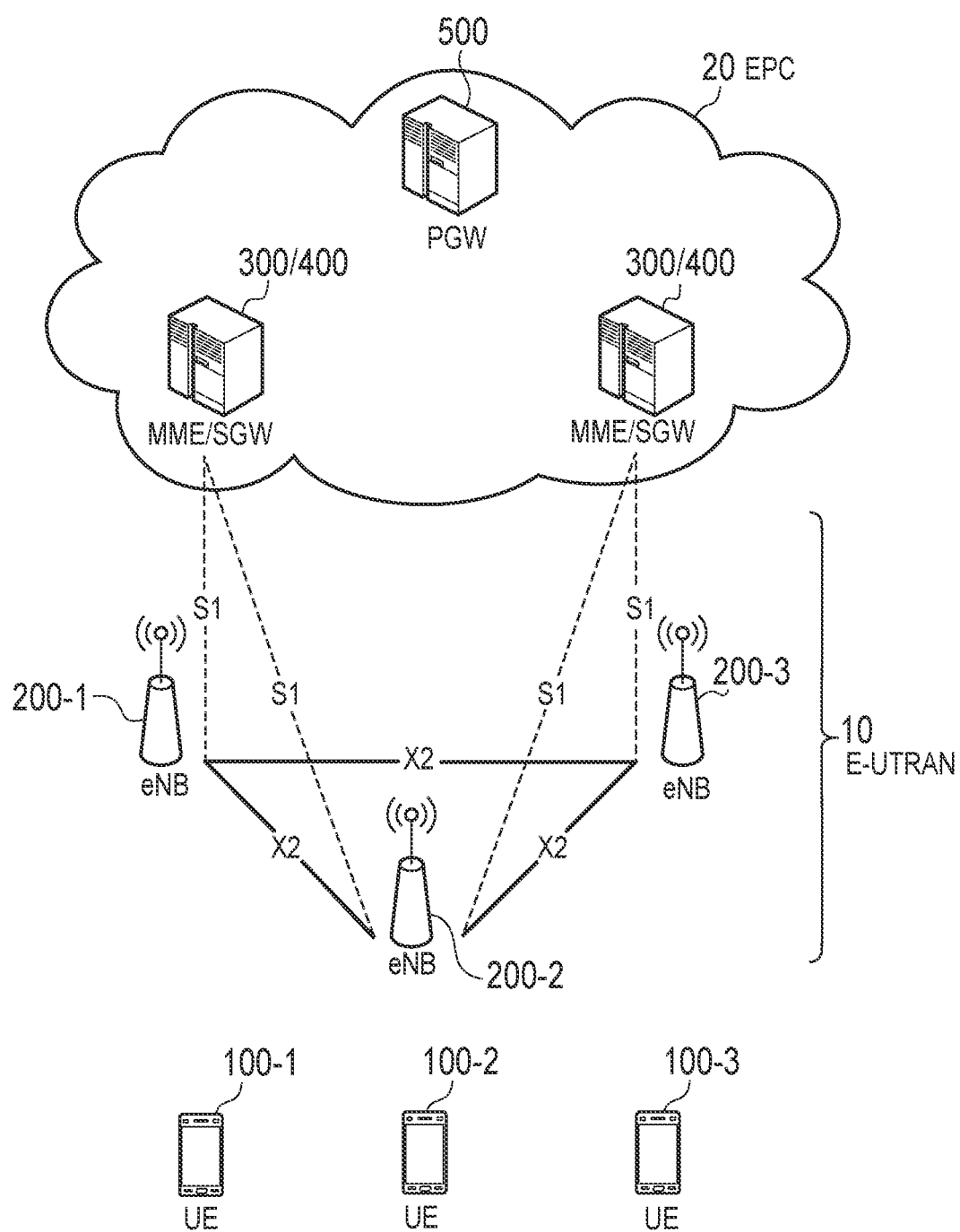
FIG. 1 is a diagram illustrating a configuration of an LTE system.

In the future, as a cell becomes smaller, it is expected that a large number of cells are arranged with high density.

Due to an increased number of cells, a coordination among cells may become complicated. As a result, the existing ICIC technology may not be able to sufficiently reduce inter-cell interference.

A radio terminal according to one embodiment may comprise a controller configured to receive first control information for receiving, by the radio terminal, a special downlink control channel. The special downlink control channel may carry control information to the radio terminal from a first cell with no connection for transmitting and receiving user data being established. The controller may directly receive second control information for reducing an uplink interference in the first cell, on the special downlink control channel, from the first cell.

The controller may receive the first control information from a second cell being a serving cell of the radio terminal.

The controller may receive the first control information from the first cell by unicast or broadcast.

The controller may reduce a transmission power, based on the second control information.

The controller may transmit information indicating that the transmission power of the radio terminal is reduced, to a second cell being a serving cell of the radio terminal.

In response to receipt of the second control information, the controller may transmit a content of the second control information to a second cell being a serving cell of the radio terminal.

The controller may receive third control information for reducing a transmission power from the second cell.

A base station according to one embodiment may comprise a controller configured to execute a control of notifying a radio terminal of first control information for receiving, by the radio terminal, a special downlink control channel. The special downlink control channel may carry control information to the radio terminal with no connection for transmitting and receiving user data being established. The controller may directly transmit second control information for reducing an uplink interference at the base station, on the special downlink control channel, to the radio terminal.

The controller may forward a request for notifying the radio terminal of the first control information, to another base station configured to manage a cell in which the radio terminal exists.

The controller may directly transmit the first control information to the radio terminal by unicast or broadcast.

A base station according to one embodiment may comprise a controller configured to manage a cell in which a radio terminal exists. The controller may transmit first control information for receiving, by the radio terminal, a special downlink control channel, to the radio terminal. The special downlink control channel may carry second control information to the radio terminal from another base station with no connection for transmitting and receiving user data being established. The second control information may be information for reducing an uplink interference at the other base station.

The controller may receive information indicating that a transmission power of the radio terminal is reduced from the radio terminal.

The controller may receive a content of the second control information from the radio terminal. The controller may transmit third control information for reducing a transmission power of the radio terminal, to the radio terminal.

A base station according to one embodiment may comprise a controller. The controller may controls: a process of determining whether or not a channel in an unlicensed spectrum is available, and a process of transmitting control information in the channel to another base station, between a first timing at which it is determined that the channel is available and a second timing at which transmission of a reference signal or a data signal is started. The control information may be information for reducing an uplink interference from a radio terminal in the base station. In the radio terminal, a connection for transmitting and receiving user data may not be established with the base station.

The controller may control a process of transmitting the control information by using an available resource in the channel after starting the transmission of the reference signal or the data signal.

A base station may comprise a controller. The controller may control: a process of determining whether or not a channel in an unlicensed spectrum is available, and a process of transmitting, in the channel, control information for reducing an uplink interference in the base station, to a radio terminal with no connection for transmitting and receiving user data being established with the base station, between a first timing at which it is determined that the channel is available and a second timing at which transmission of a reference signal or a data signal is started.

[Overview of System]

(Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to radio terminal. The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300, an SGW (Serving Gateway) 400 and a PGW (Packet Data Network Gateway) 500.

The MME 300 performs, for example, various kinds of mobility control for the UE 100. The SGW 400 performs, for example, data transfer control. The MME 300 and the SGW 400 are connected to the eNB 200 via a S1 interface. The PGW 500, for example, performs control of relaying user data from an external network (and to an external network).

Figure 2:
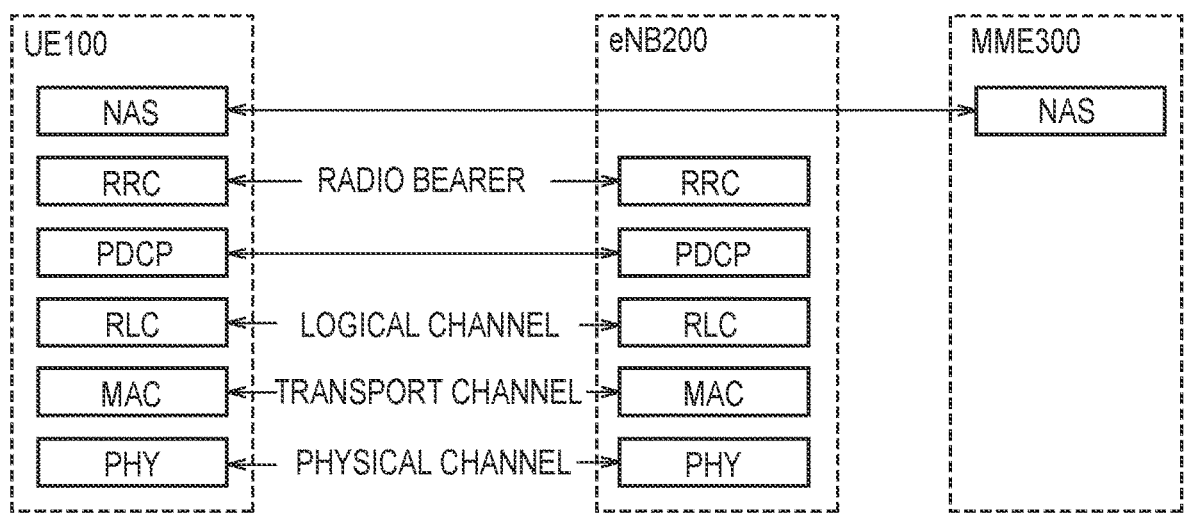
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
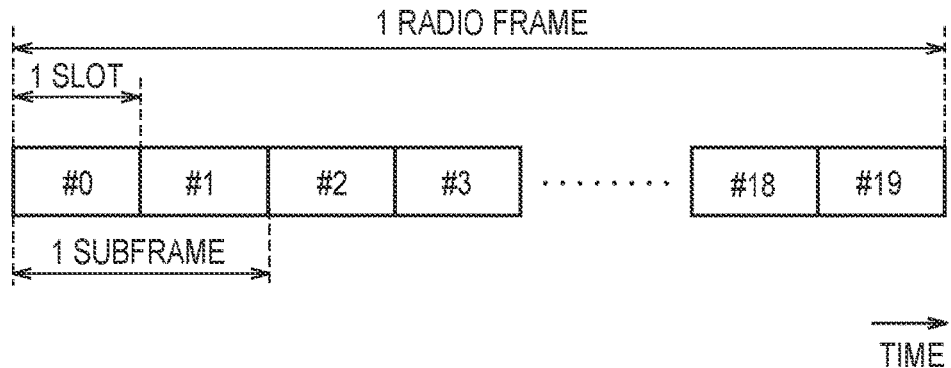
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Radio Terminal)

Figure 4:
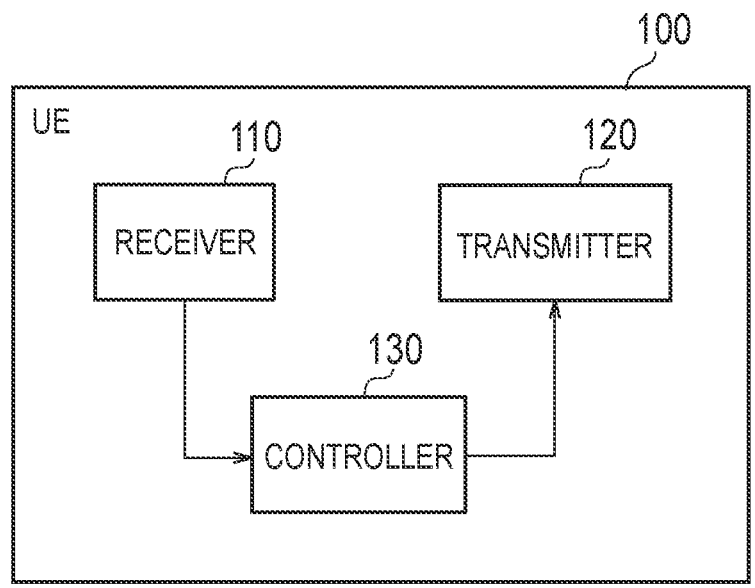
FIG. 4 is a block diagram of a UE 100.

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, as well as coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130. The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

(Base Station)

Figure 5:
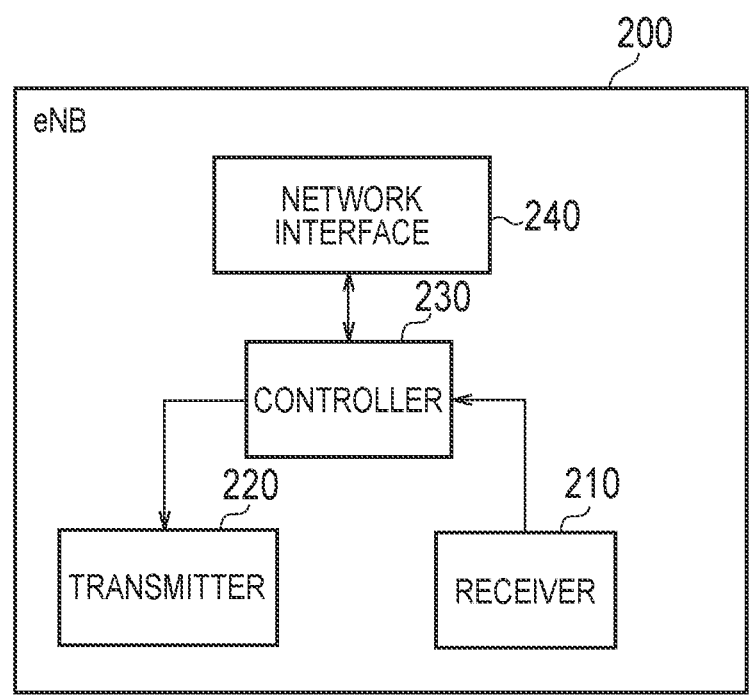
FIG. 5 is a block diagram of an eNB 200.

The eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The transmitter 210 and the receiver 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME 300 and the SGW 400 via the S1 interface. The network interface 240 is used in communication performed on the X2 interface and communication performed on the S1 interface, for example.

It is noted that for simplicity, a process executed by at least any one of the transmitter 210, the receiver 220, the controller 230, and the network interface 240 included in the eNB 200 is described herein as a process (operation) executed by the eNB 200.

(Operation According to First Embodiment)

Figure 6:
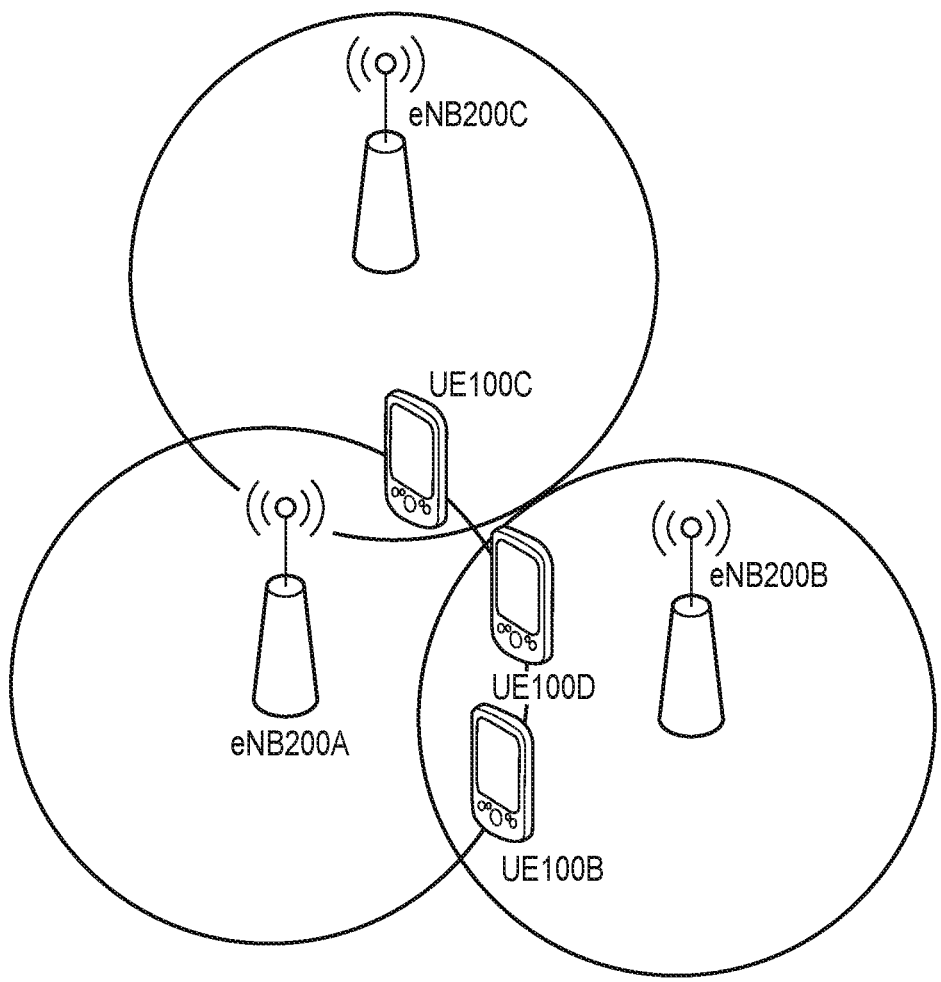
FIG. 6 is a diagram for describing an operation environment.
Figure 7:
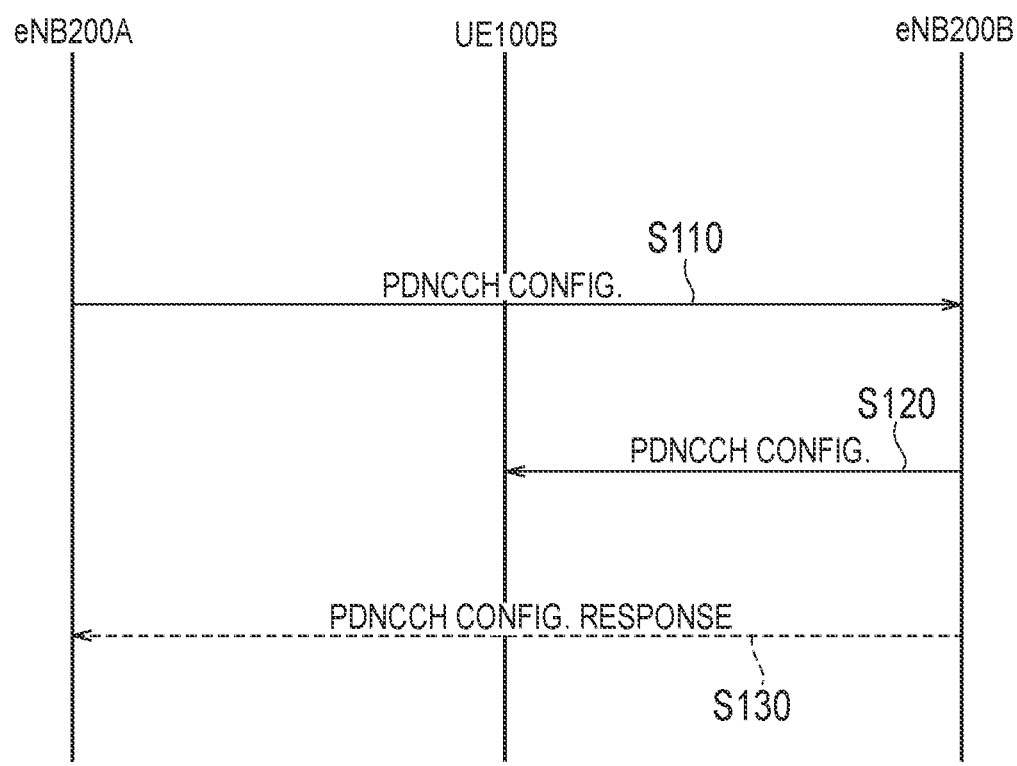
FIG. 7 is a sequence chart for describing an operation (part 1) according to a first embodiment.
Figure 8:
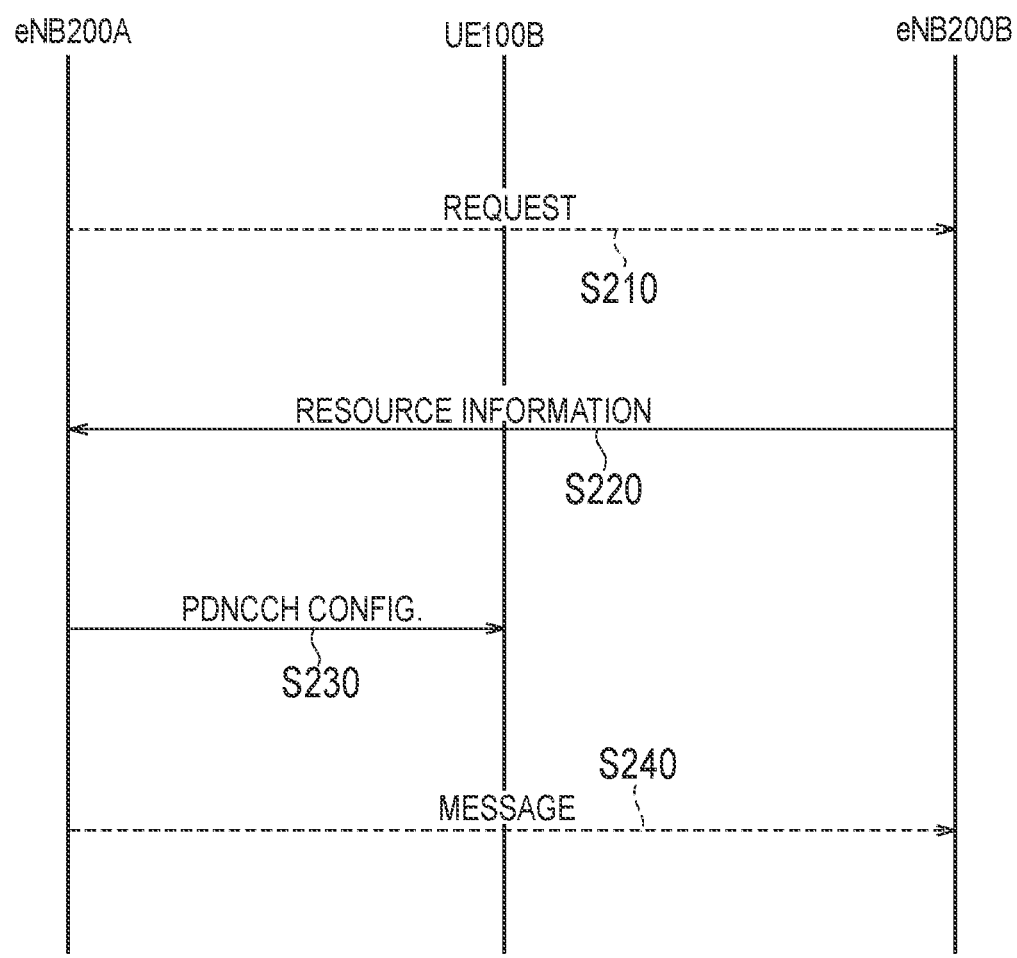
FIG. 8 is a sequence chart for describing an operation (part 2) according to the first embodiment.
Figure 9:
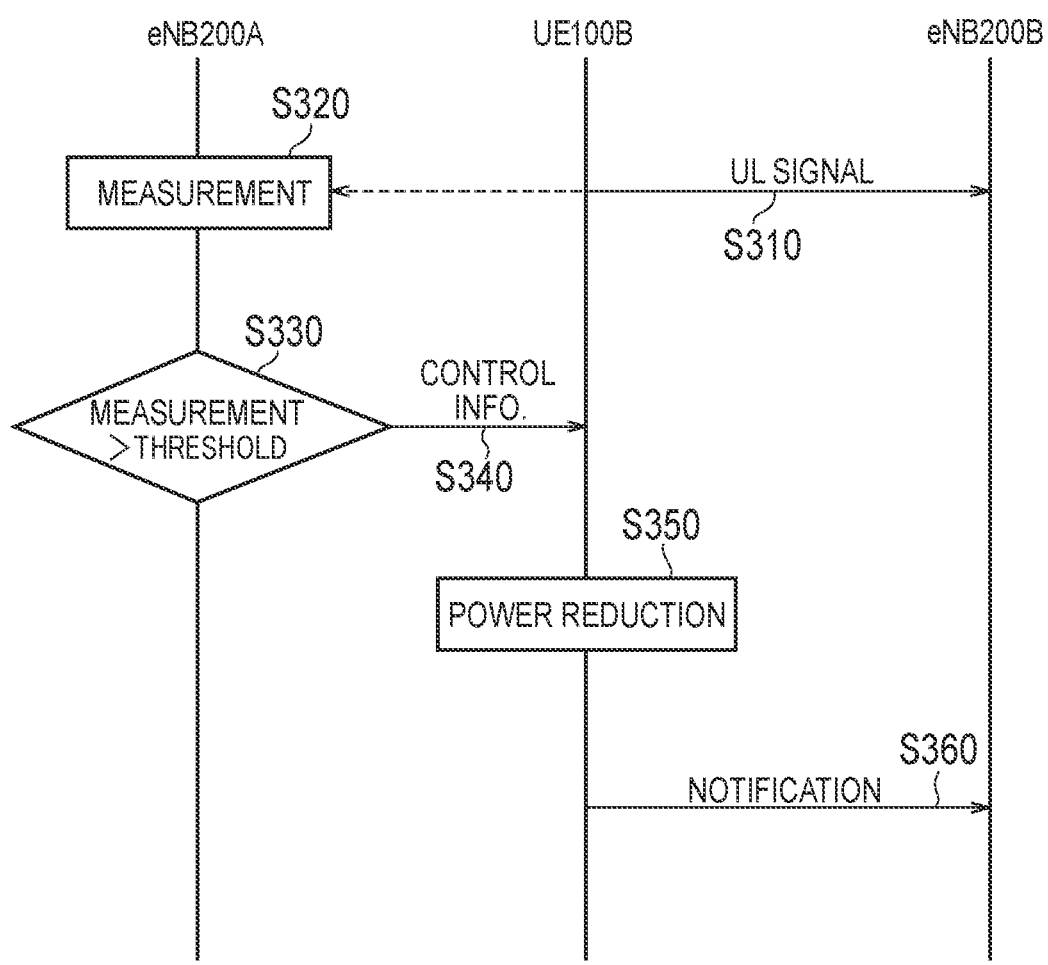
FIG. 9 is a sequence chart for describing an operation (part 3) according to the first embodiment.
Figure 10:
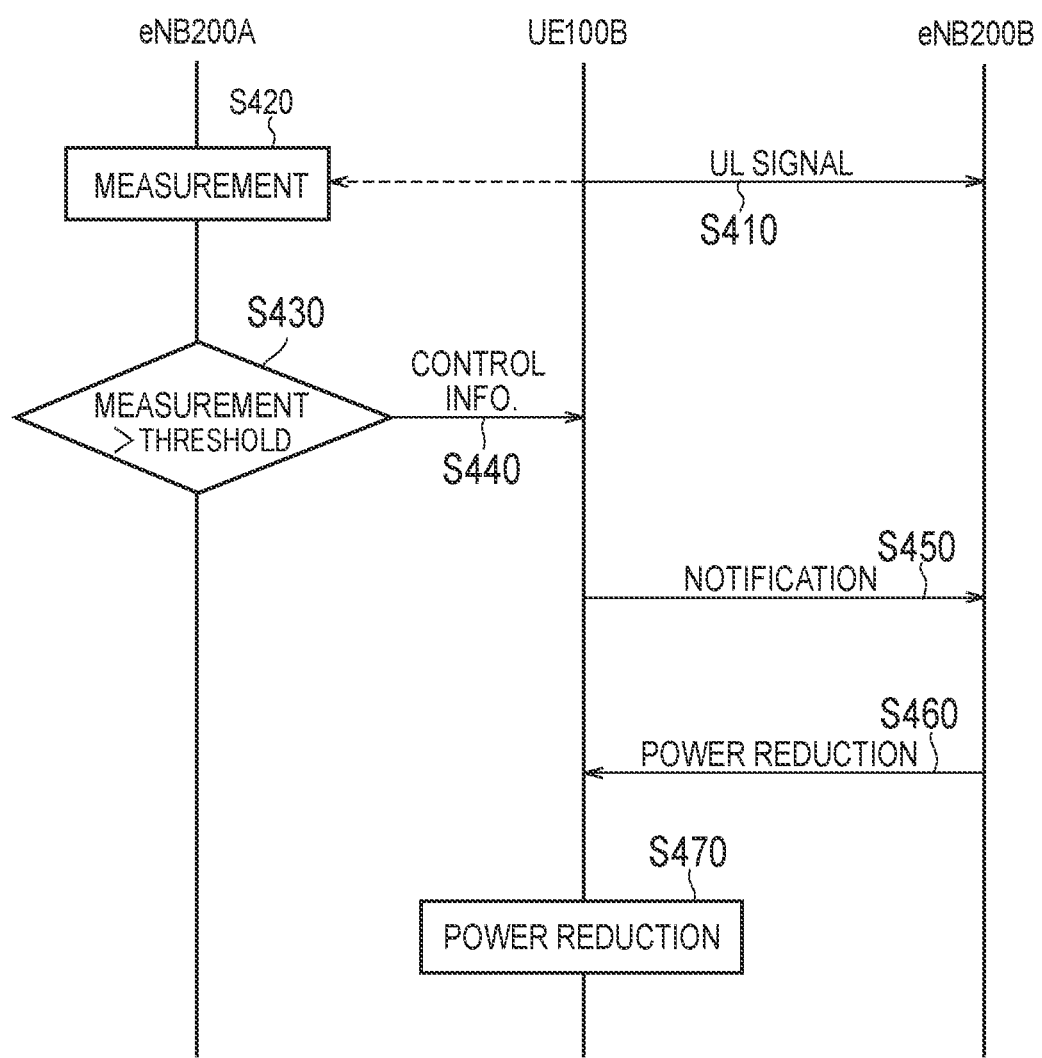
FIG. 10 is a sequence chart for describing an operation (part 4) according to the first embodiment.

An operation according to the first embodiment will be described with reference to FIG. 6 to FIG. 10. FIG. 6 is a diagram for describing an operation environment. FIG. 7 is a sequence chart for describing an operation (part 1) according to the first embodiment. FIG. 8 is a sequence chart for describing an operation (part 2) according to the first embodiment. FIG. 9 is a sequence chart for describing an operation (part 3) according to the first embodiment. FIG. 10 is a sequence chart for describing an operation (part 4) according to the first embodiment.

As illustrated in FIG. 6, an eNB 200A manages a first cell. An eNB 200B manages a second cell. An eNB 200C manages a third cell.

A UE 100B and a UE 100D exist in the second cell. If a UE exists in a cell, the UE may camp on the cell or may be connected to the cell. Therefore, the UE 100B and the UE 100D may camp on the second cell (eNB 200B). The UE 100B and the UE 100D may select the second cell. The UE 100B and the UE 100D may be in an RRC idle state for the second cell (eNB 200B). On the other hand, the UE 100B and the UE 100D may be connected to the second cell (eNB 200B). That is, the UE 100B and the UE 100D may be in an RRC connected state for the second cell (eNB 200B). Further, a UE 100C exists in the third cell.

Each UE 100 (the UE 100B to the UE 100D) has not selected the first cell. Therefore, a connection for transmitting/receiving user data is not established between each UE 100 and the eNB 200A. On the other hand, each UE 100 can receive a radio signal from the eNB 200A (first cell). Therefore, each UE 100 is located in the first cell.

The operation of the UE 100B will be mainly described on behalf of a plurality of UEs 100, below. Other UEs 100 (and the eNB 200C) can execute a similar operation.

In the first embodiment, a downlink control channel is individually set between the eNB 200A and the UE 100B.

First, two patterns of control for notifying, by the eNB 200A, the UE 100 (UE 100B) of first control information to reduce uplink interference in the eNB 200A will be described. The first pattern is a case where the eNB 200A notifies the UE 100B of the first control information via the eNB 200B. The second pattern is a case where the eNB 200A directly notifies the UE 100B of the first control information.

The eNB 200A can execute the following operation regardless of detection of the uplink interference. That is, the eNB 200A may notify the UE 100B of the first control information before detecting the uplink interference.

In the first pattern (FIG. 7), in step S110, the eNB 200A transmits a request for notifying the UE 100B of the first control information (PDNCCH (Physical Downlink Neighbor-cell Control Channel) ConFig.), to the eNB 200B.

The eNB 200A may transmit the first control information to the eNB 200B. The eNB 200A may transmit a request for notifying the UE 100B of the first control information. The request may not include the first control information. That is, the eNB 200B may determine (content of) the first control information.

In step S120, the eNB 200B (the second cell (serving cell/camp cell)) transmits the first control information to the UE 100B. Therefore, the first control information is notified from the eNB 200A to the UE 100B via the eNB 200B.

The first control information is information for receiving, by the UE 100B, a special downlink control channel (PDNCCH: Physical Downlink Neighbor-cell Control Channel). The PDNCCH is a channel for carrying control information from the eNB 200A to the UE 100B with no connection for transmitting/receiving the user data being established.

The first control information is information used for transmission (reception) of the control channel. The first control information may include at least any one of subframe information, resource block information, RNTI information, information on the number of antenna ports, transmission scheme information, CRS (Cell-specific Reference Signal) information, and DMRS (Demodulation Reference Signal) information.

The subframe information may be information in which a time of the eNB 200A is used as a reference. The subframe information may be information in which a time of the eNB 200B is used as a reference. The transmission scheme information may include information on MCS.

The subframe information and the resource block information may be set as a relative value to the PUSCH (Physical Uplink Shared CHannel) transmission resource (subframe and/or resource block) of the UE 100B for the second cell.

Each of the CRS information and the DMRS information may include at least any one of sequence information, information on the number of antenna ports, and resource information.

For example, the first control information may be configured so that the special downlink control channel is transmitted by a predetermined downlink resource block (for example, by RB #0 and 49 (excluding first three OFDM symbols) if the system bandwidth is 50 RB). The eNB 200B may exclude the resource block from a schedule of DL data.

The UE 100B receives the first control information. The UE 100B can receive second control information described later, based on the first control information.

In step S130, the eNB 200B may transmit a response (ACK: Acknowledge/NACK: Nacknowledge) to the request from the eNB 200A.

The eNB 200B may include the first control information transmitted to the UE 100B, into the response. Upon receipt of the response, the eNB 200B may grasp a radio resource (for example, time-frequency resource) used for transmitting the second control information.

If transmitting a rejection response to the request from the eNB 200A, the eNB 200B may omit the transmission in step S120.

The second pattern (FIG. 8) will be described. In the second pattern, in step S210, the eNB 200A may request the resource information, to the eNB 200B. The eNB 200A may transmit interference control information as the request, to the eNB 200B. The interference control information may include, for example, a UL interference overload indication, for example. The interference control information may include a UL High Interference Indication. The UL interference overload indication provides an interference overload report for each physical resource block (PRB).

The resource information is information on a resource used for directly transmitting the first control information to the UE 100B.

In step S220, the eNB 200B transmits the resource information to the eNB 200A. The eNB 200A receives the resource information. The resource information may include a radio resource (time-frequency resource) allocated to the UE 100B to receive the first control information.

In response to receipt of the request from the eNB 200A, the eNB 200B may transmit the resource information to the eNB 200A. The eNB 200B may periodically (or aperiodically) transmit the resource information to the eNB 200A regardless of whether or not the eNB 200B has received the request from the eNB 200A.

The eNB 200B may transmit the resource information on all the UEs 100 under the control of the eNB 200B. The eNB 200B may transmit the resource information on some of the UEs 100 under the control of the eNB 200B. For example, the eNB 200B may transmit the resource information on a UE 100 receiving the radio signal from the eNB 200B, to the eNB 200A. Based on a measurement report from the UE 100, the eNB 200B may determine whether or not the UE 100 receives the radio signal from the eNB 200A. The eNB 200B may determine (estimate) whether or not the UE 100 receives the radio signal from the eNB 200A, based on location information of the UE 100.

In step S230, the eNB 200A directly transmits the first control information to the UE 100B. The eNB 200A can transmit the first control information, based on the resource information. The eNB 200A (first cell) can transmit the first control information by unicast or broadcast. The eNB 200A may include information (identifier) for specifying the UE 100B, into the first control information. Alternatively, the eNB 200A may transmit the first control information, based on the radio resource allocated to the UE 100B.

In step S240, the eNB 200A may send a message to the eNB 200B to notify the eNB 200B that the first control information has been transmitted to the UE 100B.

Regarding the interference control method, two patterns will be described.

In the first pattern (FIG. 9), in step S310, the UE 100B transmits a UL signal (SRS (Sounding Reference Signal) or data). The UE 100B may transmit a UL signal by using a value cyclically shifted based on the information on the sequence and an identifier of the UE 100B. The UE 100B may transmit the UL signal by using a cache value calculated based on an individual identifier.

In step S320, the eNB 200A measures the UL signal from the UE 100B. The eNB 200A measures uplink interference in the eNB 200A (first cell). For example, the eNB 200A can measure RSRP (Reference Signal Received Power) and/or RSRQ (Reference Signal Received Quality)).

The eNB 200A may specify the UE 100B, based on the information (the cyclic-shifted value and/or the cache value) obtained by measuring the UL signal. The eNB 200A may specify the eNB 200B configured to manage the UE 100B from which the UL signal is transmitted.

The eNB 200A may estimate an identifier (individual identification number) of the UE 100B from a peak position of the UL signal. The eNB 200A may specify the eNB 200B configured to manage the UE 100B and/or the UE 100B, based on the radio resource used for transmitting the UL signal. For example, the radio resource used for transmitting the UL signal may be associated with the identifier of the UE 100B.

The eNB 200A may specify the UE 100B or the eNB 200B, based on the information received from the eNB 200B.

In step S330, the eNB 200A determines whether or not a measurement value (uplink interference value: measurement value of the UL signal from the UE 100B) exceeds a threshold value.

When the measurement value exceeds the threshold value, the eNB 200A executes a process of step S340. When the measurement value is less than the threshold value, the eNB 200A ends the process.

In step S340, the eNB 200A directly transmits the second control information to the UE 100B on the PDNCCH. The eNB 200A may individually transmit the second control information to the UE 100B by unicast. For example, the eNB 200A may transmit the second control information to the UE 100B by broadcast (for example, SIB: System Information Block). The second control information may include the identifier of the UE 100B.

A special bearer (data path) for transmitting and receiving the control information may be formed between the eNB 200A and the UE 100B. The bearer may not be formed when a bearer for transmitting and receiving the user data is formed between the eNB 200A and the UE 100B.

The second control information includes information for reducing the uplink interference in the eNB 200A (first cell).

The second control information may include a content for reducing a transmission power. For example, the second control information may be a power reduction value (for example, 1 dB). The second control information may be a value for changing a value ($\alpha$ value: path loss compensation value) used in a power determination expression.

The second control information may include an identifier of an entity to which the message is transmitted. For example, the second control information may include at least any one of the identifier of the UE 100B, the identifier of the eNB 200B, and the identifier of the second cell. The second control information may include an identifier of an entity from which the message is transmitted. For example, the second control information may include the identifier of the eNB 200A and/or the identifier of the first cell.

The second control information may include information on a resource by which the eNB 200B has received interference. Thus, the UE 100B can determine whether or not the UE 100B itself is an interference source. The UE 100B may determine whether to execute the power control. For example, the second control information may include an identifier (an identifier of any one of a subframe, a resource block, and DMRS sequence information) indicating a resource that the eNB 200B has received interference.

The second control information may include Information for determining the operation of the UE 100B for reducing the uplink interference. The UE 100B may determine, based on the information, which operation, that is, an operation of FIG. 9 or an operation of FIG. 10, is executed.

In FIG. 9, in step S350, the UE 100B reduces the transmission power, based on the second control information. The UE 100B may reduce the transmission power if the second control information includes at least one of the identifier of the eNB 200B and the identifier of the second cell even though not including the identifier of the UE 100B.

If it is unknown whether the second control information is destined to the UE 100B (for example, if the second control information is transmitted by broadcast), the UE 100B may reduce the transmission power if the measurement value (for example, the RSRP and the RSRQ) of a reception signal from the eNB 200A (first cell) exceeds a threshold value.

In step S360, the UE 100B transmits information (notification) indicating that the transmission power of the UE 100B is reduced, to the second cell (eNB 200B). the transmission power of The UE 100B may be reduced after transmitting the information.

The notification may include a content (for example, a power reduction value) of at least a part of the second control information.

In response to receipt of the notification, the eNB 200A learns that the transmission power of the UE 100B is reduced. The eNB 200A manages the transmission power of the UE 100B, based on the notification.

In the second pattern (FIG. 10), steps S410 to S440 correspond to steps S310 to S340.

In step S450, the UE 100B transmits the notification to the eNB 200B (second cell) in response to receipt of the second control information. The notification may include the content of the second control information.

The eNB 200B may determine whether or not to approve the second control information. If not approving the second control information, the eNB 200B may ignore the notification from the UE 100B.

In step S460, the eNB 200B can forward third control information (instruction) for reducing transmission power. The eNB 200B may determine the power reduction value in consideration of the content of the second control information. The reduction value included in the third control information may be the same as or different from the reduction value indicated by the second control information.

The third control information may include information for maintaining the transmission power.

In step S470, the UE 100B reduces the transmission power, based on the third control information received from the second cell (eNB 200B).

As described above, the eNB 200B can directly transmit a second transmission power to the UE 100B with no connection for transmitting/receiving the user data being established. As a result, it is possible to reduce the uplink interference received by the eNB 200B.

(First Modification of First Embodiment)

Figure 11:
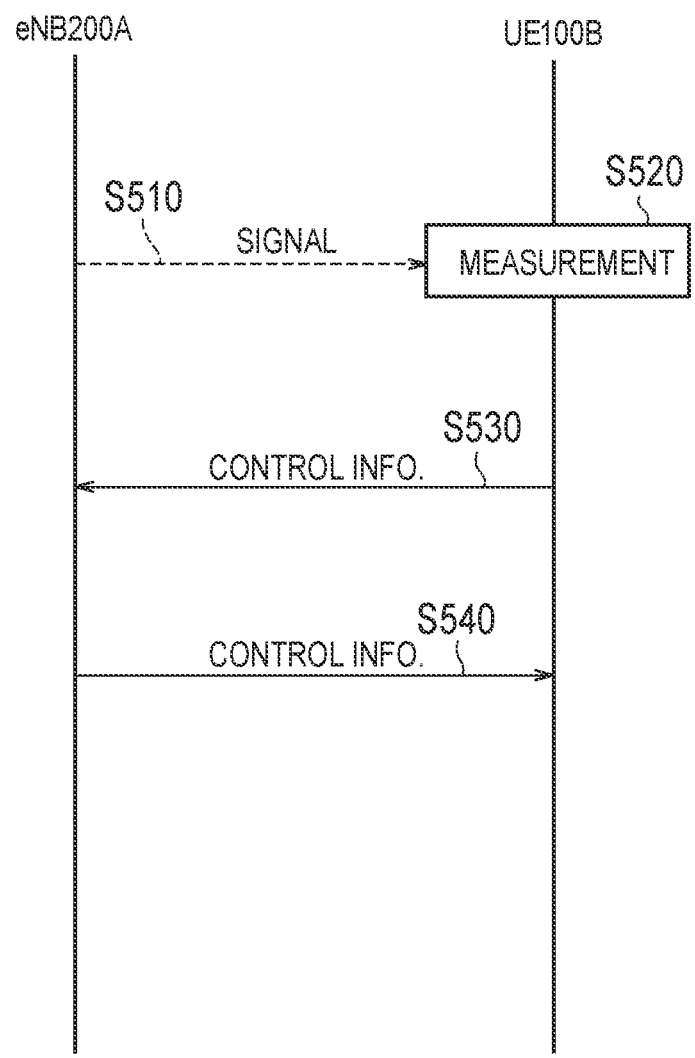
FIG. 11 is a sequence chart for describing a first modification of the first embodiment.

A first modification of the first embodiment will be described with reference to FIG. 11. FIG. 11 is a sequence chart for describing the first modification of the first embodiment. Description of parts similar to those described above will be omitted where appropriate.

As illustrated in FIG. 11, in step S510, the eNB 200A transmits a downlink signal. The UE 100B measures (monitors) the reception signal. The UE 100B may measure reception signals from a plurality of eNBs 200. Similarly to the above-described first control information, the UE 100B may receive the control information for measurement from the eNB 200A or the eNB 200B.

When the measurement value from the eNB 200 exceeds the threshold value, the UE 100B can execute a process of step S530, on the eNB 200 from which the control information is transmitted. The UE 100B may execute the process of step S530 on the eNB 200 having the largest reception signal (or the eNB 200 having the smallest path loss) from among the plurality of eNBs 200. Description proceeds with an assumption that the UE 100B determines to execute the process of step S530 on the eNB 200B.

In step S530, the UE 100B can transmit the control information on a special uplink control channel (PUNCCH: Physical Uplink Neighbor-cell Control Channel).

The control information here may be information indicating that the eNB 200A and the UE 100B are close, for example. The control information may be, for example, information triggering the transmission of the second control information.

The PUNCCH is a channel for carrying the control information from the UE 100B to the eNB 200A with no connection for transmitting/receiving the user data being established. The control information for transmitting, by the UE 100B, the special PUNCCH, similarly to the first control information, may be notified to the UE 100B. The control information, together with the first control information, may be notified to the UE 100B.

The control information may include an identifier (for example, IMSI: International Mobile Subscriber Identity) of the UE 100B.

In step S540, the eNB 200B may transmit the second control information to the UE 100B in response to receipt of the control information.

The subsequent operations are similar to those in the first embodiment.

As described above, when the eNB 200B and the UE 100B are close to each other, the eNB 200B can transmit to the UE 100B the second control information. As a result, it is possible to reduce the uplink interference received by the eNB 200B.

(Second Modification of First Embodiment)

Figure 12:
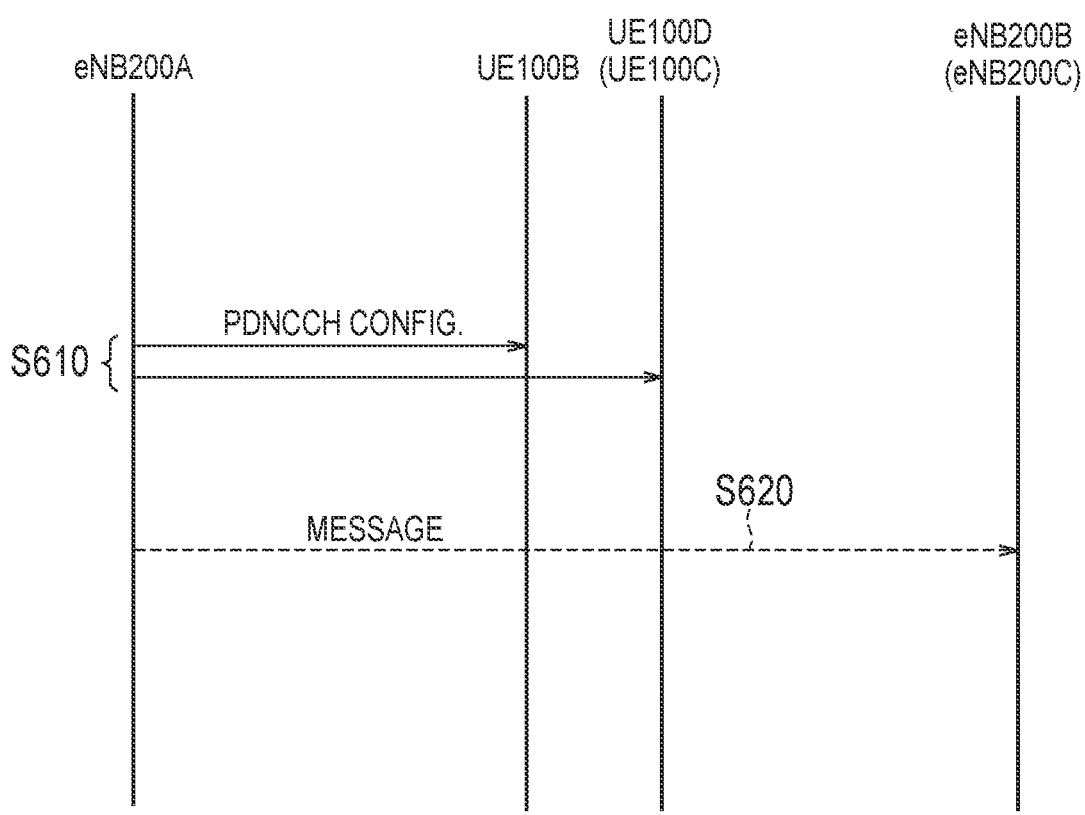
FIG. 12 is a sequence chart for describing a second modification of the first embodiment.

A second modification of the first embodiment will be described with reference to FIG. 12. FIG. 12 is a sequence chart for describing the second modification of the first embodiment. Description of parts similar to those described above will be omitted where appropriate.

In the above-described first embodiment, in the first control information, the PDNCCH is set individually to each UE 100. In the present modification, the common PDNCCH may be set to a plurality of UEs 100 under the control of one eNB 200.

As illustrated in FIG. 12, in step S610, the eNB 200B can transmit the first control information by broadcast (for example, SIB). Thus, the first control information is information for setting the common PDNCCH to a plurality of UEs 100 (the UE 100B, the UE 100D (and/or the UE 100C)). As a result, the eNB 200B can transmit the second control information to the plurality of UEs 100, on the common PDNCCH.

In FIG. 7 (step S110), the eNB 200B may transmit the first control information for setting the common PDNCCH, by broadcast.

Step S620 corresponds to step S250. The eNB 200B may transmit a message to the eNB 200C.

(Third Modification of First Embodiment)

Figure 13:
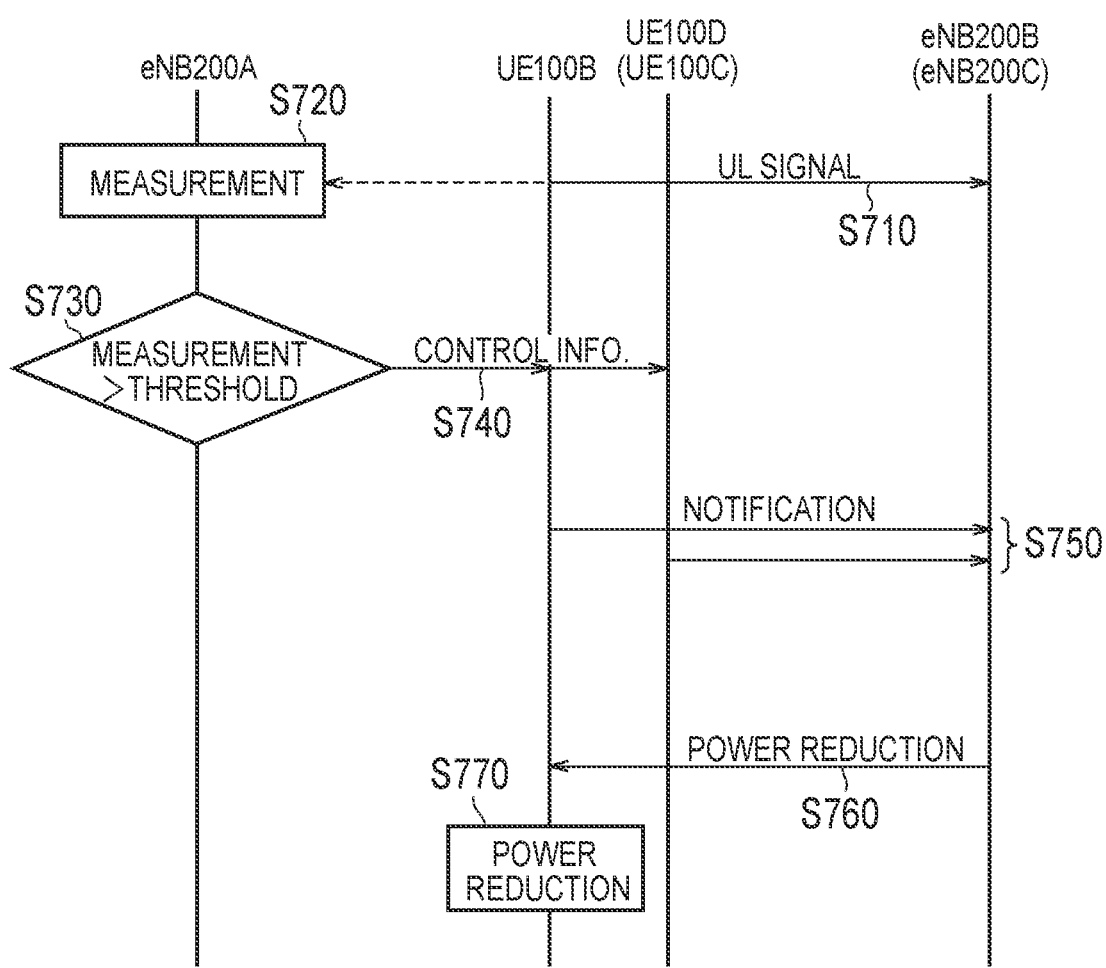
FIG. 13 is a sequence chart for describing a third modification of the first embodiment.

A third modification of the first embodiment will be described with reference to FIG. 13. FIG. 13 is a sequence chart for describing the third modification of the first embodiment. Description of parts similar to those described above will be omitted where appropriate.

In the present modification, the eNB 200A can transmit the second control information on the common PDNCCH to the plurality of UEs 100 under the control of the plurality of eNBs 200 (the eNB 200B and the eNB 200C).

Step S710 to step S730 correspond to step S310 to step S330. A description will be given on the assumption that the UE 100B has transmitted the UL signal. A description will be given on the assumption that the UE 100D (and the UE 100C) have not transmitted the UL signal.

In step S730, the eNB 200A may not need to specify the UE 100B being the cause of the uplink interference. The eNB 200A may not need to specify the eNB 200B (second cell) configured to manages the UE 100B being the cause of the uplink interference.

In step S740, the eNB 200B can transmit the second control information, by broadcast, on the PDNCCH.

In step S750, each UE 100 can transmit the notification to the eNB 200B (second cell) (or the eNB 200C (third cell)) in response to receipt of the second control information.

Each UE 100 may execute the operation of step S750 when a transmission target of the second control information is each UE 100 itself. Otherwise, the UE 100 may omit the transmission of the notification. Each UE 100 can determine the transmission target, based on at least any one of an identifier (at least one of an identifier of the UE, an identifier of the eNB, and an identifier of the cell) included in the second control information.

When each UE 100 determines that each UE 100 is the reason of the uplink interference, each UE 100 may execute a transmission power control (see step S350).

The eNB 200B (or the eNB 200C) can determine the transmission target of the third control information, based on the notification. The eNB 200B can determine that the UE 100B is the transmission target.

Steps S760 and S770 correspond to steps S460 and S470. The eNB 200B may not transmit the third control information to the UE 100D.

As described above, the eNB 200A may transmit the second control information by broadcast. As a result, the UE 100 not capable of receiving the second control information is no longer subject to the transmission power control. As a result, it is possible to effectively control the uplink interference in the eNB 200A.

(Fourth Modification of First Embodiment)

Figure 14:
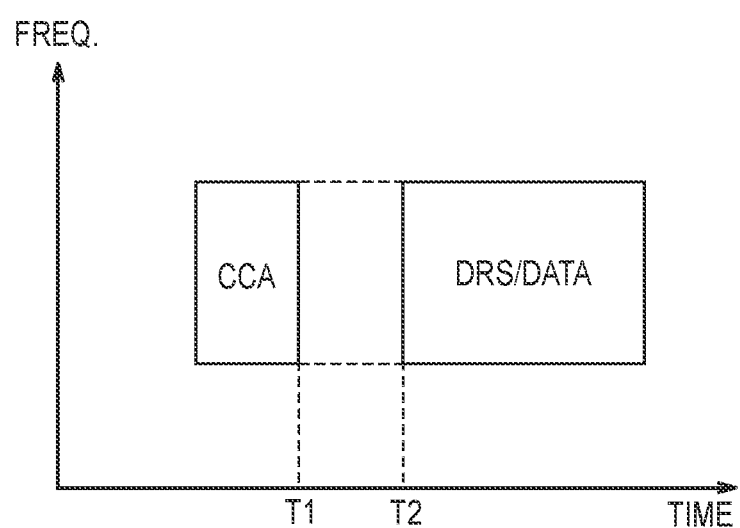
FIG. 14 is a chart for describing a fourth modification of the first embodiment.

A fourth modification of the first embodiment will be described with reference to FIG. 14. FIG. 14 is a chart for describing the fourth modification of the first embodiment. Description of parts similar to those described above will be omitted where appropriate.

The eNB 200A can execute an LAA (Licensed-Assisted Access) operation. Specifically, the eNB 200A can transmit the second control information to the UE 100B, in a channel in an unlicensed spectrum (unlicensed channel)). An unlicensed spectrum is a channel not requiring a license to transmit a radio signal.

The eNB 200A can determine whether or not the unlicensed channel is available. That is, the eNB 200A executes CCA (Clear channel Assessment). In the CCA, the eNB 200A measures a power in the unlicensed channel.

The eNB 200A can transmit the second control information between a first timing (T1) at which it is determined that the channel is available and a second timing (T2) at which transmission of a reference signal (DRS) or a data signal (DATA) is started. The eNB 200A may transmit a pseudo noise signal in a region other than the second control information, in a predetermined period (first period) between the first timing and the second timing. The first period is a period during which the reference signal and the data signal can not be transmitted.

The first control information may include a timing (and the unlicensed channel) at which the eNB 200A executes the CCA. The UE 100B may receive the second control information from the eNB 200A, based on the first control information. In response to receipt of the second control information, the UE 100B can execute the above-described operation.

The eNB 200A may transmit the second control information by using an available resource, in a region where the reference signal or the data signal is transmitted. The eNB 200A may transmit the second control information in both the first period and a second period during which the reference signal or the data signal is transmitted. The eNB 200A may transmit the second control information in one of the first period and the second period.

When performing the transmission in the second period, the eNB 200A may transmit the second control information by using a blank resource block present in the control region. For example, to transmit the second control information, the eNB 200 may use a blank resource element not used for transmitting a CRS (Cell-specific Reference Signal) and a synchronization signal (PSS (Primary Synchronization Signal)/SSS (Secondary Synchronization Signal)), in the control region of the second period.

Second Embodiment

Figure 15:
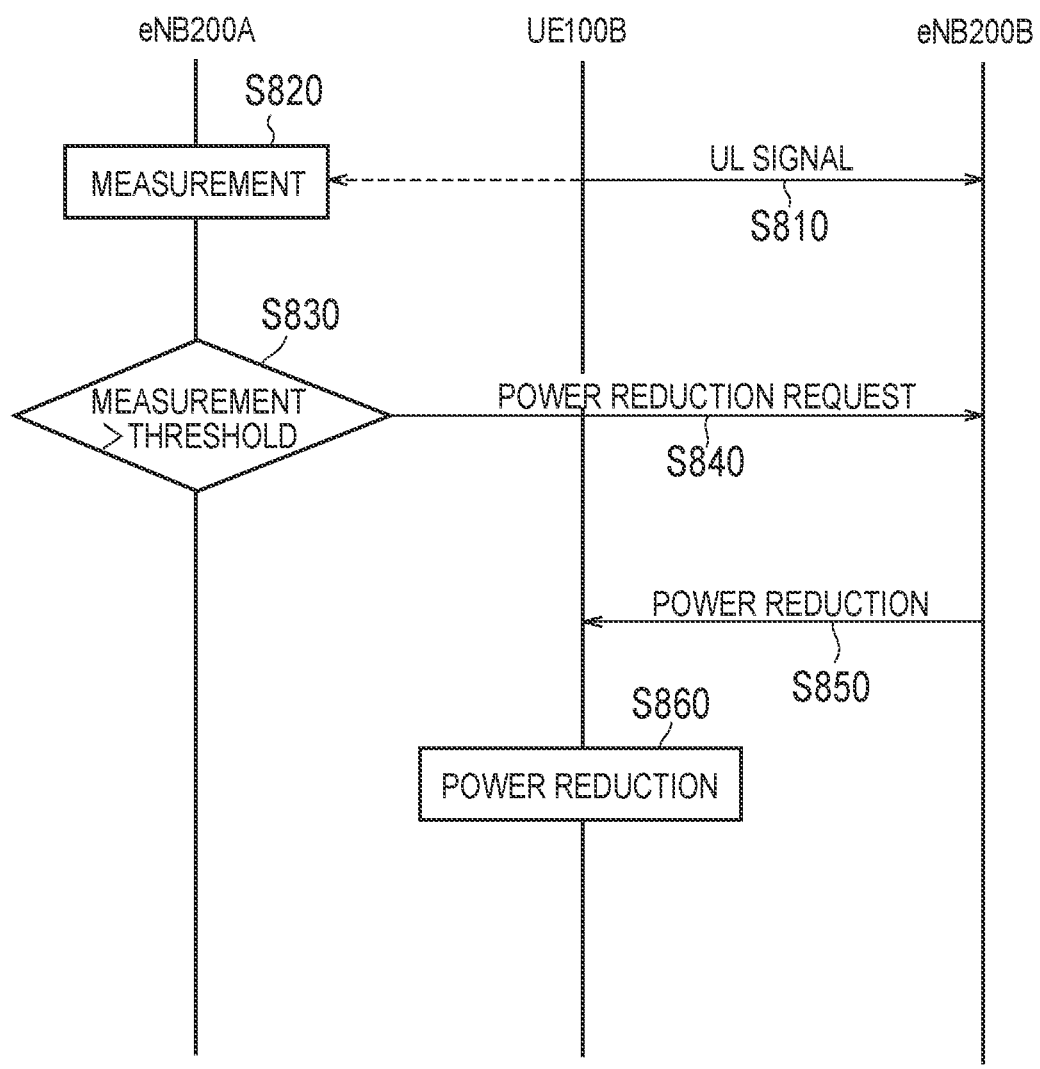
FIG. 15 is a sequence chart for describing a second embodiment.

A second embodiment will be described with reference to FIG. 15. FIG. 15 is a sequence chart for describing the second embodiment. Description of parts similar to those described above will be omitted where appropriate.

In FIG. 15, steps S810 to S830 correspond to steps S310 to S330.

In step S830, the eNB 200A specifies an eNB 200B configured to manage the UE 100B from which an uplink interference signal is transmitted. The eNB 200A may specify the UE 100B.

In step S840, the eNB 200A transmits a request (Power reduction request) including control information for reducing the uplink interference, to the eNB 200B. The control information may include information included in the second control information.

Here, similarly to the above-described fourth modification of the first embodiment, the eNB 200A can transmit the control information to the eNB 200B, in the unlicensed channel. The eNB 200A may transmit the control information by unicast or by broadcast. The control information may include at least any one of an identifier of the UE 100B, an identifier of the eNB 200A, an identifier of the second cell, and identification information indicating a resource subject to the uplink interference.

The eNB 200A may transmit the control information in both the first period (period between T1 and T2) and the second period (period after T2) (see FIG. 14). The eNB 200A may transmit the control information in one of the first period and the second period.

The eNB 200A and the eNB 200B may exchange information on a resource used for transmitting the request.

In step S850, the eNB 200B can forward, to the UE 100B, the control information (instruction) for reducing the transmission power, based on the received request (control information).

Step S860 corresponds to step S470.

(Modification of Second Embodiment)

Figure 16:
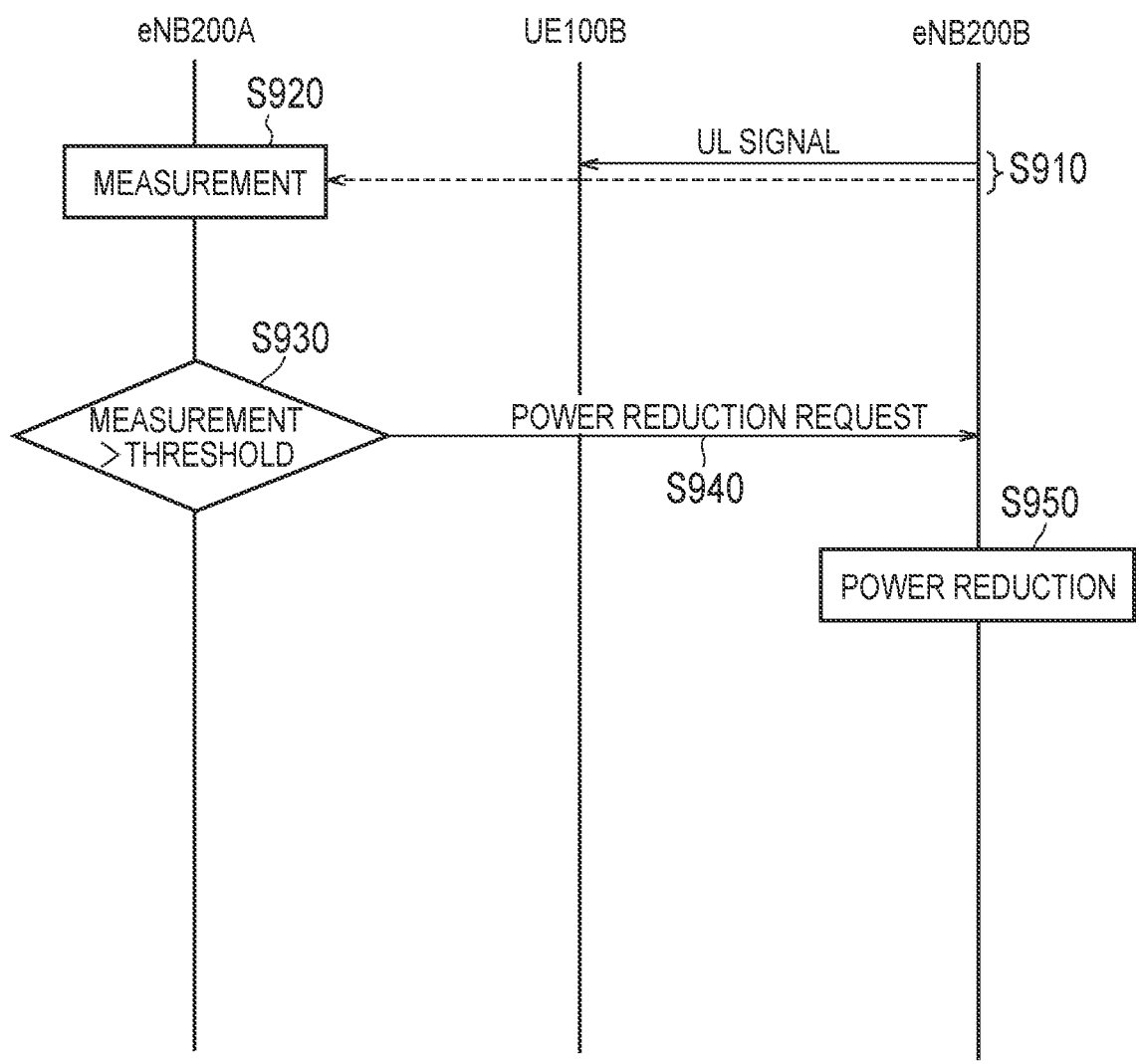
FIG. 16 is a sequence chart for describing a modification of the second embodiment.

The modification second embodiment will be described with reference to FIG. 16. FIG. 16 is a sequence chart for describing a modification of the second embodiment. Description of parts similar to those described above will be omitted where appropriate.

In FIG. 16, in step S910, the eNB 200B transmits a downlink signal (DL signal) (for example, to the UE 100B).

In step S920, the eNB 200A measures an interference signal from the eNB 200B.

In step S930, similarly to step S330, it is determined whether or not the measurement value (the measurement value of the DL signal from the eNB 200B) exceeds a threshold value.

When the measurement value exceeds the threshold value, the eNB 200A executes a process of step S940. When the measurement value is less than the threshold value, the eNB 200A ends the process.

In step S940, as described above, the eNB 200A can transmit the control information to the eNB 200B in the unlicensed channel.

The eNB 200A may transmit the control information in both the first period (period between T1 and T2) and the second period (period after T2) (see FIG. 14). The eNB 200A may transmit the control information in one of the first period and the second period.

The control information is information for reducing the transmission power of the eNB 200B. The control information may include a power reduction value of the eNB 200B. The second control information may be a value for changing a value ($\alpha$ value: path loss compensation value) used in a power determination expression. The control information may include information for reducing the transmission power of the UE 100B.

Other Embodiments

The contents of the present application are described according to the above-described embodiments, but it should not be understood that the discussion and the drawings constituting a part of this disclosure limit the contents of the present application. From this disclosure, various alternative embodiments, examples, and operational technologies will become apparent to those skilled in the art.

In the above description, the eNB 200A can execute the operation for notifying the UE 100 of the first control information, regardless of the detection of the uplink interference. Therefore, the eNB 200A may execute an operation for notifying the UE 100 of the first control information even after detecting the uplink interference. For example, the eNB 200A may execute an operation for notifying the UE 100 of the first control information when the cause (UE 100) of the uplink interference is unknown.

In each of the above-described embodiments, to reduce a load of the UE 100, the eNB 200B (eNB 200C) may transmit an instruction (information) indicating whether or not to receive the second control information from the eNB 200A, to UEs 100 under the control of the eNB 200B (eNB 200C). Based on the instruction, the UE 100 may determine whether or not to execute the operation for receiving the second control information.

The operation according to each of the above-described embodiments may be executed in combination thereof, where appropriate. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (including the UE 100 and the eNB 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

Alternatively, a chip may be provided which includes: a memory for storing a program for executing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

The invention claimed is:

1. A radio terminal, comprising:
a controller configured to receive first control information for receiving, by the radio terminal, a special downlink control channel which carries control information to the radio terminal from a first cell which has not established a with no connection for transmitting and receiving user data with the radio terminal, wherein
the controller is configured to directly receive, from the first cell which has not established the connection with the radio terminal, on the special downlink control channel based on the received first control information, second control information for reducing an uplink interference in the first cell, and
in response to receipt of the second control information, the controller is configured to transmit, to a second cell being a serving cell of the radio terminal, a content of the second control information received from the first cell which has not established the connection with the radio terminal.

2. The radio terminal according to claim 1, wherein the controller is configured to receive the first control information from the first cell by unicast or broadcast.

3. The radio terminal according to claim 1, wherein the controller is configured to reduce a transmission power, based on the second control information.

4. The radio terminal according to claim 3, wherein the controller is configured to transmit information indicating that the transmission power of the radio terminal is reduced, to a second cell being a serving cell of the radio terminal.

5. The radio terminal according to claim 1, wherein the controller is configured to receive third control information for reducing a transmission power from the second cell.

6. A base station, comprising:
a controller configured to execute a control of notifying a radio terminal of first control information for receiving, by the radio terminal, a special downlink control channel which carries control information to the radio terminal from the base station which has not established a connection for transmitting and receiving user data with the radio terminal, wherein
the controller is configured to directly transmit, from the base station which has not established the connection with the radio terminal, on the special downlink control channel based on the first control information, second control information for reducing an uplink interference at the base station, and
a content of the second control information is transmitted by the radio terminal to another base station being a serving cell of the radio terminal.

7. The base station according to claim 6, wherein the controller is configured to forward a request for notifying the radio terminal of the first control information, to another base station configured to manage a cell in which the radio terminal exists.

8. The base station according to claim 6, wherein the controller is configured to directly transmit the first control information to the radio terminal by unicast or broadcast.

9. A base station, comprising:
- a controller configured to manage a cell in which a radio terminal exists, wherein
- the controller is configured to transmit first control information for receiving, by the radio terminal, a special downlink control channel which carries control information to the radio terminal from another base station which has not established a connection for transmitting and receiving user data with the radio terminal,
- the second control information is information for reducing an uplink interference at the another base station, and
- the controller is configured to receive, from the radio terminal, a content of the second control information received from the another base station which has not established the connection with the radio terminal.

10. The base station according to claim 9, wherein the controller is configured to receive information indicating that a transmission power of the radio terminal is reduced from the radio terminal.

11. The base station according to claim 9, wherein
- the controller is configured to transmit third control information for reducing a transmission power of the radio terminal, to the radio terminal.

* * * * *